United States Patent
Kim et al.

(10) Patent No.: US 7,349,374 B2
(45) Date of Patent: Mar. 25, 2008

(54) UPLINK TRANSMISSION POWER CONTROL IN WIRELESS COMMUNICATION SYSTEM

(75) Inventors: Bong Hoe Kim, Gyeonggi-do (KR); Joon Kui Ahn, Seoul (KR); Hak Seong Kim, Seoul (KR); Dong Wook Roh, Seoul (KR); Dong Youn Seo, Seoul (KR); Seung Hwan Won, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 245 days.

(21) Appl. No.: 11/201,958

(22) Filed: Aug. 10, 2005

(65) Prior Publication Data
US 2006/0034223 A1   Feb. 16, 2006

(30) Foreign Application Priority Data
Aug. 11, 2004   (KR) .................. 10-2004-0063124

(51) Int. Cl.
*H04Q 7/20* (2006.01)

(52) U.S. Cl. .................. 370/331; 370/328; 370/329; 370/334; 370/333; 455/436; 455/442; 455/438; 455/422.1; 455/522; 455/500

(58) Field of Classification Search ............... 370/331, 370/332, 333, 334, 329, 328; 455/310, 436, 455/444, 442, 437, 438, 439, 440, 441, 422.1, 455/403, 414.1, 423, 424, 425, 500, 517, 455/450, 451, 452.1, 509, 550.1, 445, 522, 455/69

See application file for complete search history.

(56) References Cited

U.S. PATENT DOCUMENTS

| 2003/0050084 A1* | 3/2003 | Damnjanovic et al. ...... 455/522 |
| 2005/0111407 A1* | 5/2005 | Hosein et al. ............... 370/329 |
| 2005/0141454 A1* | 6/2005 | Jain et al. ................... 370/331 |

FOREIGN PATENT DOCUMENTS

WO    WO 01/47146 A1    6/2001

\* cited by examiner

*Primary Examiner*—Keith Ferguson
(74) *Attorney, Agent, or Firm*—Lee, Hong, Degerman, Kang & Schmadeka (57) ABSTRACT

A method of controlling uplink transmission of a user equipment in a soft handover mode in a wireless communication system comprises communicating with a first network and a second network, at a first transmission mode comprising a first transmission power level and a first data rate. The method also comprises receiving a first change command from the second network to change the first transmission mode to a second transmission mode, wherein the second transmission mode comprises a second transmission power level and a second data rate. The method also comprises entering the second transmission mode. The method also comprises maintaining the second transmission mode for a predetermined time period regardless of a second change command from the first network to increase at least one of transmission power level and data rate of the user equipment.

39 Claims, 4 Drawing Sheets

UPLINK TRANSMISSION POWER CONTROL IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Application No. 10-2004-0063124, filed on Aug. 11, 2004, the contents of which are hereby incorporated by reference herein in their entirety.

FIELD OF THE INVENTION

The present invention relates generally to a wireless communication system and, more particularly, to uplink transmission power control in a wireless communication system.

BACKGROUND OF THE INVENTION

Node-B scheduling is a process in which a node-B controls uplink transmissions of user equipments (UEs) present in a cell controlled by the node-B when the UEs transmit packets in the uplink. The control by the node-B is in real time. Such control may more efficiently utilize uplink resources and improve cell throughput and capacity.

In a related art node-B scheduling method, the node-B transmits a command for limiting uplink packet transmission power level or transmission data rate of the UEs at each transmission time interval (TTI). This limitation allows rise over thermal (ROT) in the cell to be maintained at an appropriate level.

A UE may be in a soft handover between two or more node-Bs. One of the node-Bs may provide a scheduling command pertaining to the uplink transmission power level or transmission data rate of the UE. The node-B providing the scheduling command is referred to as a scheduling node-B of the UE. Conversely, a node-B in communication with the UE during handover that does not provide a scheduling command pertaining to the UE is referred to as a non-scheduling node-B of the UE.

A UE in soft handover with a node-B and receiving a scheduling command from the scheduling node-B is referred to as a scheduled UE of the node-B. Conversely, a UE in soft handover with a node-B receiving no scheduling command of the node-B is referred to as a non-scheduled UE of the node-B.

A scheduling node-B may be unable to determine interference caused by a scheduled UE to neighboring non-scheduling nodes. Therefore, the scheduling node-B may be unable to account for the interference to the neighboring cells in scheduling the scheduled UE. Therefore, the node-B may be unable to control the interference caused by its scheduled UEs, even in cases of excessive interference.

One proposal for limiting the interference involves a node-B transmitting uplink transmission power level or transmission data rate reduction commands to non-scheduled UEs of the node-B in the downlink. The reduction commands include a 'Down' command for reducing the uplink transmission power level or transmission data rate and a 'None' command to indicate that no specific operation is required. When the UE receives a Down command from the non-scheduling node-B, the UE reduces its uplink transmission power level or transmission data rate to a specific level, regardless of a scheduling command received from the scheduling node-B. Conversely, when the UE receives a None command indicating no specific operation, the UE increases or decreases its transmission power level or transmission data rate according to a command from the scheduling node-B. The node-B may transmit Down/None commands to individual non-scheduled UEs of the node-B or, alternatively, may broadcast Down/None commands to all non-scheduled UEs of the node-B.

Figure 1:
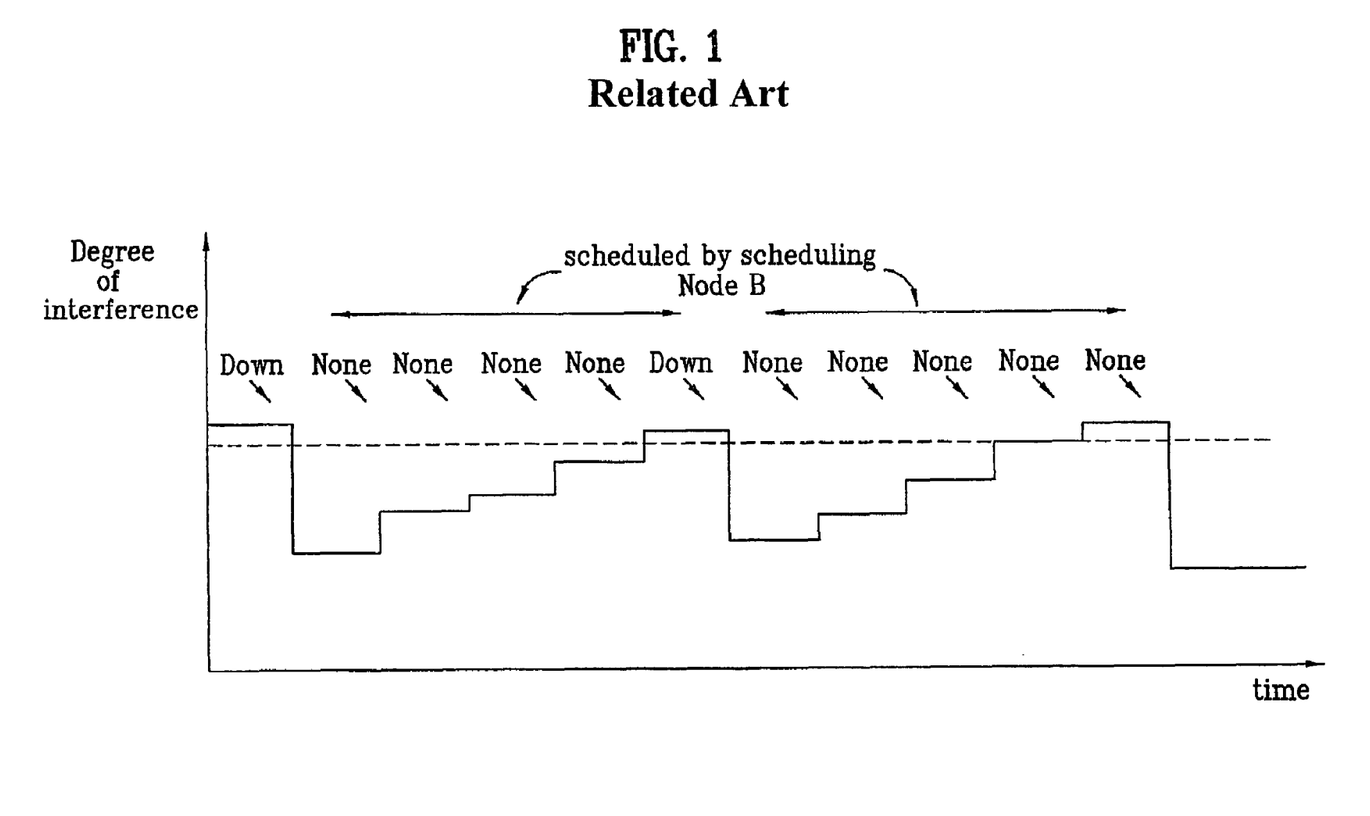
FIG. 1 is a diagram illustrating a related art node-B scheduling method.

FIG. 1 is a diagram illustrating a related art node-B scheduling method.

Referring to FIG. 1, in a time interval in which a UE receives a None command from its non-scheduling node-B that indicates no specific operation, the UE increases or decreases its uplink transmission power level or transmission data rate according to a command from its scheduling node-B. The non-scheduling node-B transmits a Down command to the UE if the interference to the non-scheduling node-B rises above a certain level as the UE increases the transmission power level or transmission data rate according to the scheduling command from the scheduling node-B.

Upon receiving a Down command from the non-scheduling node-B, the UE decreases the transmission power level or transmission data rate to a specific level, regardless of the scheduling command from the scheduling node-B. If the uplink transmission power level or transmission data rate of the UE drops below the scheduled rate, the scheduling node-B attempts scheduling of the UE to raise the transmission power level or transmission data rate back to a desired level. As a result, the interference to the non-scheduling node-B increases, causing the non-scheduling node-B to retransmit a Down command. As this process repeats, the interference to the non-scheduling node-B repeatedly increases and decreases (e.g., oscillates).

Accordingly, the interference to the non-scheduling node-B may not be maintained at a desired level, causing difficulty for the non-scheduling node-B to perform appropriate scheduling of its scheduled UEs. Furthermore, it may be difficult for each scheduling node-B to properly schedule its UEs, since uplink ROT caused by UEs in soft handover greatly varies.

SUMMARY OF THE INVENTION

Accordingly, the present invention is directed to uplink transmission power control that substantially obviates one or more problems due to limitations and disadvantages of the related art.

An object of the present invention is to provide uplink transmission power control to prevent a user equipment (UE) from causing excessive interference to a node-B when performing a handover.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in one embodiment, a method of controlling uplink transmission of a user equipment in a soft handover mode in a wireless communication system comprises communicating with a first network and a second network, at a first transmission mode comprising a first transmission power level and a first data rate. The method also comprises receiving a first change command from the second network to change the first transmission mode to a second transmission mode, wherein the second transmission mode comprises a second transmission power level and a second data rate. The method also comprises entering the second transmission mode. The method also comprises maintaining the second transmission mode for a predetermined time period regardless of a second change command from the first network to increase at least one of transmission power level and data rate of the user equipment.

The first network may comprise a serving network and the second network comprises a non-serving network. The second transmission power level may be lower than the first transmission power level. The second data rate may be lower than the first data rate. The first change command may be associated with decreasing at least one of transmission power level and data rate of the user equipment. The first change command may be included in a scheduling command from the second network.

In the step of maintaining the second transmission mode, the user equipment may decrease at least one of transmission power level and data rate if another change command is received from one of the first and second networks to decrease at least one of transmission power level and data rate. The predetermined time may be received from the first network.

In another embodiment, a method of controlling uplink transmission of a user equipment in a soft handover mode in a wireless communication system comprises communicating with a first network and a second network, at a first transmission mode comprising a first transmission power level and a first data rate. The method also comprises receiving a first change command from the second network to change the first transmission mode to a second transmission mode, wherein the second transmission mode comprises a second transmission power level and a second data rate. The method also comprises entering the second transmission mode. The method also comprises maintaining the second transmission mode while a maintain command is received from the second network regardless of a second change command from the first network to increase at least one of transmission power level and data rate of the user equipment.

The first change command and the maintain command may be represented by a scheduling command from the second network. The maintain command and the first change command may be modulated to have opposite polarities. In the step of maintaining the second transmission mode, the user equipment may decrease at least one of transmission power level and data rate if another change command is received from the first network to decrease at least one of transmission power level and data rate.

In yet another embodiment, a method of controlling uplink transmission of a user equipment in a soft handover mode in a wireless communication system comprises communicating with a first network and a second network, at a first transmission mode comprising a first transmission power level and a first data rate. The method also comprises transmitting a first change command to cause the user equipment from the second network to change the first transmission mode to a second transmission mode, wherein the second transmission mode comprises a second transmission power level and a second data rate. The method also comprises transmitting a maintain command to the user equipment to cause the user equipment to maintain the second transmission mode for a predetermined time period regardless of a second change command from the first network to increase at least one of transmission power level and data rate of the user equipment.

In still another embodiment, a method of controlling uplink transmission of a user equipment in a soft handover mode in a wireless communication system comprises communicating with a first network and a second network, at a first transmission mode comprising a first transmission power level and a first data rate. The method also comprises transmitting a first change command to cause the user equipment from the second network to change the first transmission mode to a second transmission mode, wherein the second transmission mode comprises a second transmission power level and a second data rate. The method also comprises transmitting a maintain command to the user equipment to cause the user equipment to maintain the second transmission mode regardless of a second change command from the first network to increase at least one of transmission power level and data rate of the user equipment.

The foregoing and other objects, features, aspects and advantages of the present invention will become more apparent from the following detailed description of the present invention when taken in conjunction with the accompanying drawings. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

A UE may be in a soft handover between two or more node-Bs. One of the node-Bs may provide a scheduling command pertaining to the uplink transmission power level and/or transmission data rate of the UE. The node-B providing the scheduling command is referred to as a scheduling node-B of the UE. Conversely, a node-B in communication with the UE during handover that does not provide a scheduling command pertaining to the UE is referred to as a non-scheduling node-B of the UE.

Although the present invention is described using the term node-B, it should be understood that node-B represents any fixed base station or network in communication with UEs.

A UE in soft handover with a node-B and receiving a scheduling command from the scheduling node-B is referred to as a scheduled UE of the node-B. Conversely, a UE in soft handover with a node-B receiving no scheduling command of the node-B is referred to as a non-scheduled UE of the node-B.

Figure 2:
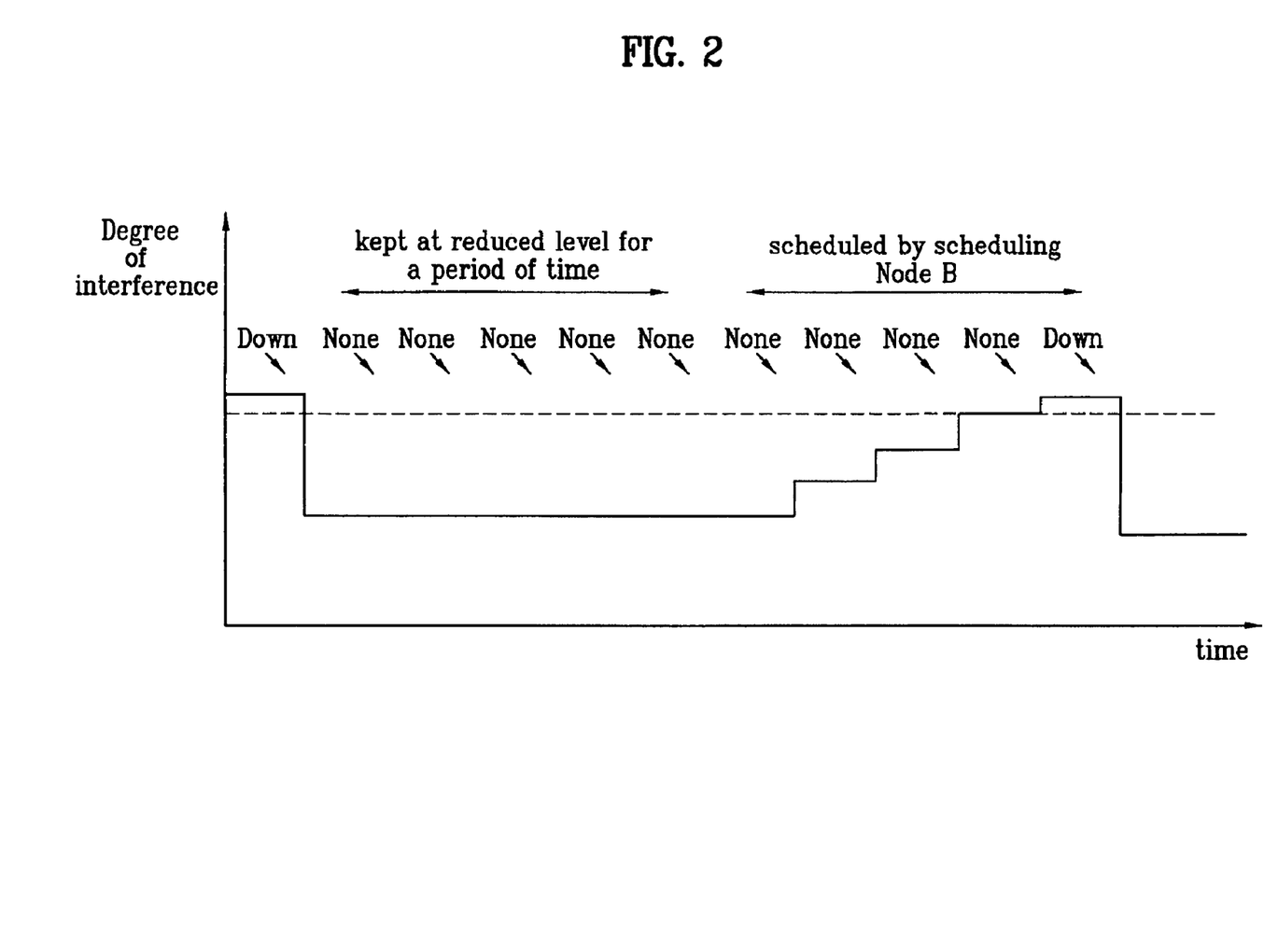
FIG. 2 is a diagram illustrating a node-B scheduling method, according to an embodiment of the present invention.

FIG. 2 is a diagram illustrating a node-B scheduling method, according to an embodiment of the present invention.

Referring to FIG. 2, the non-scheduling node-B transmits or broadcasts 'Down'/'None' commands to its non-scheduled UEs. When the non-scheduling node-B issues a transmission power level and/or transmission data rate Down command to its non-scheduled UE, the non-scheduled UE reduces its transmission power level and/or transmission data rate to a specific level and does not increase the transmission power level and/or transmission data rate for a predetermined period of time (e.g., $N_{keep}$ slots or TTIs (transmission time intervals)). The predetermined period of time may, for example, originate in an upper layer of the network and be communicated to the UE. Alternatively, the predetermined period of time may be known by the UE.

During the $N_{keep}$ slots or TTIs after the UE receives the transmission power level and/or transmission data rate Down command from its non-scheduling node-B and reduces the transmission power level and/or transmission data rate, the UE does not increase the transmission power level and/or transmission data rate even when the UE receives a scheduling command from its scheduling node-B requesting the UE to increase the transmission power level and/or transmission data rate. However, the UE may perform an operation corresponding to a transmission power level and/or transmission data rate Down command from its scheduling node-B.

When the non-scheduling node-B issues a None command to the UE after the $N_{keep}$ slots or TTIs, the UE increases or decreases its transmission power level and/or transmission data rate according to a scheduling command received from the scheduling node-B.

In an event that there are a plurality of non-scheduling node-Bs for a UE, the UE may operate as described above when receiving a Down command from one of the plurality of non-scheduling node-Bs. For example, when receiving a Down command from one of the plurality of non-scheduling node-Bs, the UE reduces its transmission power level and/or transmission data rate to a specific level and does not increase the transmission power level and/or transmission data rate during $N_{keep}$ slots or TTIs after the receipt of the Down command.

Figure 3:
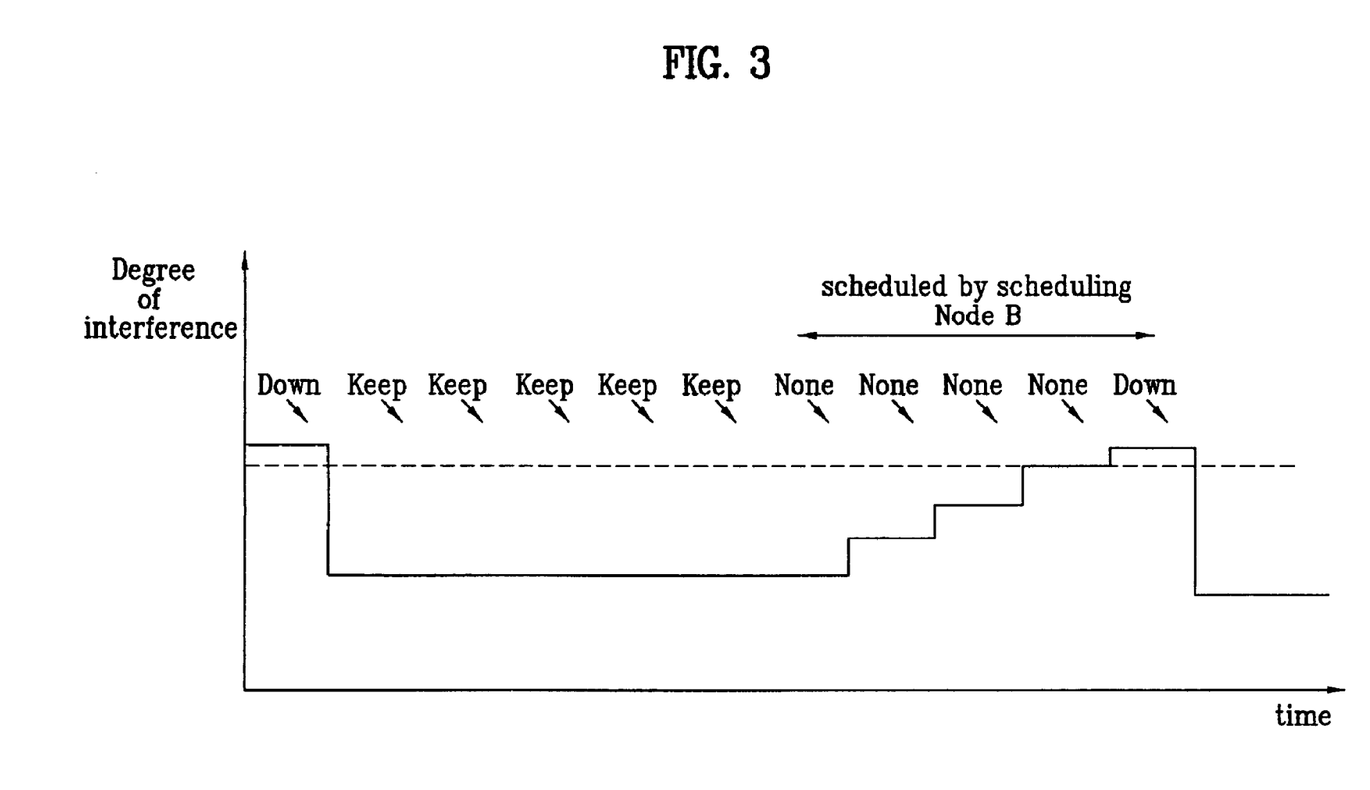
FIG. 3 is a diagram illustrating a node-B scheduling method, according to another embodiment of the present invention.

FIG. 3 is a diagram illustrating a node-B scheduling method, according to another embodiment of the present invention.

Referring to FIG. 3, a node-B transmits or broadcasts 'Down'/'None'/'Keep' commands to its non-scheduled UEs. The Down command indicates 'transmission power level and/or transmission data rate reduction'. The None command indicates 'no specific command'. A 'Keep' command, as described further below, is another command that may be transmitted from the non-scheduling node-B.

Upon receiving a Down command from its non-scheduling node-B, the UE decreases its transmission power level and/or transmission data rate to a specific level, regardless of a scheduling command received from its scheduling node-B. Alternatively, upon receiving a None command from the non-scheduling node-B, the UE increases or decreases its transmission power level and/or transmission data rate depending on a scheduling command received from the scheduling node-B. Again, in the alternative, upon receiving a Keep command from the non-scheduling node-B, the UE keeps the current transmission power level and/or transmission data rate, regardless of a scheduling command received from the scheduling node-B.

In an event that there are a plurality of non-scheduling node-Bs for a UE, the UE reduces its transmission power level and/or transmission data rate if it receives a Down command from any one of the plurality of non-scheduling node-Bs, regardless of commands received from other non-scheduling node-Bs. If the UE receives a Keep command from one of the plurality non-scheduling node-Bs without receiving a Down command from any non-scheduling node-B, the UE keeps the current transmission power level and/or transmission data rate.

Figure 4:
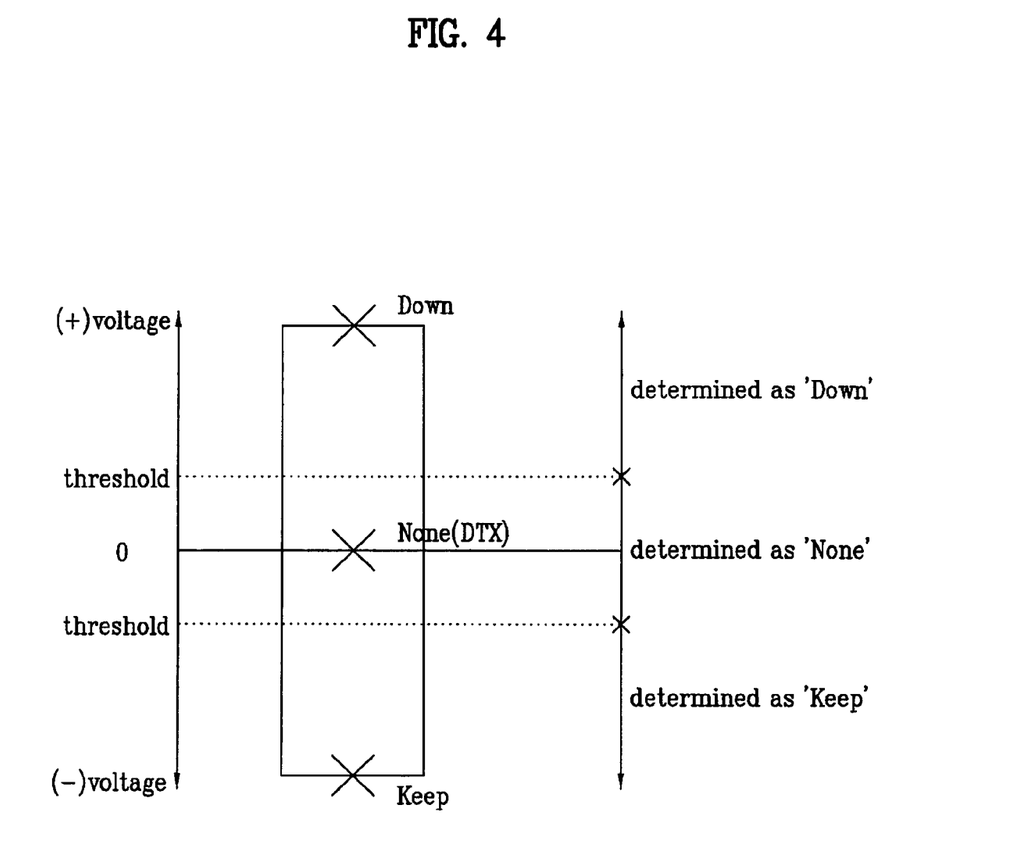
FIG. 4 is a diagram illustrating a method for modulating node-B scheduling control commands, according to an embodiment of the present invention.

FIG. 4 is a diagram illustrating a method for modulating node-B scheduling control commands, according to an embodiment of the present invention.

Referring to FIG. 4, Down and Keep commands are transmitted from the non-scheduling node-B when the interference in the cell is too high. Furthermore, None commands may be transmitted from the non-scheduling node-B. Accordingly, a modulation method for transmission of Down/Keep/None commands may be employed in which there is no None command transmitted. This exemplary modulation method corresponds to discontinuous transmission (DTX), as shown in FIG. 4. As such, Down and Keep commands are transmitted after being modulated into signals having opposite voltages, thereby achieving efficient transmission of Down/Keep/None commands.

In another embodiment, a node-B scheduling method may include a node-B passing a command received from its non-scheduling node-B to its scheduling node-B in the uplink instead of directly implementing the received command.

For example, the non-scheduling node-B transmits or broadcasts Down/None commands or Down/Keep/None commands to the UE. However, the node-B does not directly implement a command received from the non-scheduling node-B. Instead, the node-B passes the received command to the scheduling node-B. The scheduling node-B determines whether to keep or decrease the uplink transmission power level and/or transmission data rate of the UE, taking account of the command received from the UE, and transmits the result of the determination to the UE.

Accordingly, the non-scheduling node-B, which does not know the buffer state or priority of the UE or the uplink state of the scheduling node-B of the UE, is prevented from imposing unilateral restrictions on the UE, thereby achieving appropriate scheduling control.

In an event that there are a plurality of non-scheduling node-Bs for a UE, the UE may pass a Down command received from one of the plurality of non-scheduling node-Bs to its scheduling node-B. Alternatively, the UE may pass a Keep command received from one of the plurality of non-scheduling node-Bs to its scheduling node-B if the UE receives the Keep command without receiving a Down command from any non-scheduling node-B.

In one embodiment, a method of controlling uplink transmission of a user equipment in a soft handover mode in a wireless communication system comprises communicating with a first network and a second network, at a first transmission mode comprising a first transmission power level and a first data rate. The method also comprises receiving a first change command from the second network to change the first transmission mode to a second transmission mode, wherein the second transmission mode comprises a second transmission power level and a second data rate. The method also comprises entering the second transmission mode. The method also comprises maintaining the second transmission mode for a predetermined time period regardless of a second change command from the first network to increase at least one of transmission power level and data rate of the user equipment.

The first network may comprise a serving network and the second network comprises a non-serving network. The second transmission power level may be lower than the first transmission power level. The second data rate may be lower than the first data rate. The first change command may be associated with decreasing at least one of transmission power level and data rate of the user equipment. The first change command may be included in a scheduling command from the second network.

In the step of maintaining the second transmission mode, the user equipment may decrease at least one of transmission power level and data rate if another change command is received from one of the first and second networks to decrease at least one of transmission power level and data rate. The predetermined time may be received from the first network.

In another embodiment, a method of controlling uplink transmission of a user equipment in a soft handover mode in a wireless communication system comprises communicating with a first network and a second network, at a first transmission mode comprising a first transmission power level and a first data rate. The method also comprises receiving a first change command from the second network to change the first transmission mode to a second transmission mode, wherein the second transmission mode comprises a second transmission power level and a second data rate. The method also comprises entering the second transmission mode. The method also comprises maintaining the second transmission mode while a maintain command is received from the second network regardless of a second change command from the first network to increase at least one of transmission power level and data rate of the user equipment.

The first change command and the maintain command may be represented by a scheduling command from the second network. The maintain command and the first change command may be modulated to have opposite polarities. In the step of maintaining the second transmission mode, the user equipment may decrease at least one of transmission power level and data rate if another change command is received from the first network to decrease at least one of transmission power level and data rate.

In yet another embodiment, a method of controlling uplink transmission of a user equipment in a soft handover mode in a wireless communication system comprises communicating with a first network and a second network, at a first transmission mode comprising a first transmission power level and a first data rate. The method also comprises transmitting a first change command to cause the user equipment from the second network to change the first transmission mode to a second transmission mode, wherein the second transmission mode comprises a second transmission power level and a second data rate. The method also comprises transmitting a maintain command to the user equipment to cause the user equipment to maintain the second transmission mode for a predetermined time period regardless of a second change command from the first network to increase at least one of transmission power level and data rate of the user equipment.

In still another embodiment, a method of controlling uplink transmission of a user equipment in a soft handover mode in a wireless communication system comprises communicating with a first network and a second network, at a first transmission mode comprising a first transmission power level and a first data rate. The method also comprises transmitting a first change command to cause the user equipment from the second network to change the first transmission mode to a second transmission mode, wherein the second transmission mode comprises a second transmission power level and a second data rate. The method also comprises transmitting a maintain command to the user equipment to cause the user equipment to maintain the second transmission mode regardless of a second change command from the first network to increase at least one of transmission power level and data rate of the user equipment.

Although the above embodiments have been described with reference to node-B scheduling applied to control of transmission power level and/or transmission data rate of UEs, the node-B scheduling method may be applied to control maximum allowable transmission power level, transmission data rate, or transmission power of UEs.

The present invention may provide control of uplink transmission to enable more efficient control of the interference to a node-B caused by a UE which is not subject to schedule of the node-B and which is in communication with the node-B during handover.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A method of controlling uplink transmission of a user equipment in a soft handover mode in a wireless communication system, the method comprising:
   communicating with a first network and a second network, at a first transmission mode comprising a first transmission power level and a first data rate;
   receiving a first change command from the second network to change the first transmission mode to a second transmission mode, wherein the second transmission mode comprises a second transmission power level and a second data rate;
   entering the second transmission mode; and
   maintaining the second transmission mode for a predetermined time period regardless of a second change command from the first network to increase at least one of transmission power level and data rate of the user equipment.

2. The method of claim 1, wherein the first network comprises a serving network and the second network comprises a non-serving network.

3. The method of claim 1, wherein the second transmission power level is lower than the first transmission power level.

4. The method of claim 1, wherein the second data rate is lower than the first data rate.

5. The method of claim 1, the first change command is associated with decreasing at least one of transmission power level and data rate of the user equipment.

6. The method of claim 1, wherein the first change command is included in a scheduling command from the second network.

7. The method of claim 1, wherein in the step of maintaining the second transmission mode, the user equipment decreases at least one of transmission power level and data rate if another change command is received from one of the first and second networks to decrease at least one of transmission power level and data rate.

8. The method of claim 1, wherein the predetermined time is received from the first network.

9. A method of controlling uplink transmission of a user equipment in a soft handover mode in a wireless communication system, the method comprising:
communicating with a first network and a second network, at a first transmission mode comprising a first transmission power level and a first data rate;
receiving a first change command from the second network to change the first transmission mode to a second transmission mode, wherein the second transmission mode comprises a second transmission power level and a second data rate;
entering the second transmission mode; and
maintaining the second transmission mode while a maintain command is received from the second network regardless of a second change command from the first network to increase at least one of transmission power level and data rate of the user equipment.

10. The method of claim 9, wherein the first network comprises a serving network and the second network comprises a non-serving network.

11. The method of claim 9, wherein the second transmission power level is lower than the first transmission power level.

12. The method of claim 9, wherein the second data rate is lower than the first data rate.

13. The method of claim 9, the first change command is associated with decreasing at least one of transmission power level and data rate of the user equipment.

14. The method of claim 9, wherein the first change command and the maintain command are represented by a scheduling command from the second network.

15. The method of claim 14, wherein the maintain command and the first change command are modulated to have opposite polarities.

16. The method of claim 9, wherein in the step of maintaining the second transmission mode, the user equipment decreases at least one of transmission power level and data rate if another change command is received from the first network to decrease at least one of transmission power level and data rate.

17. A method of controlling uplink transmission of a user equipment in a soft handover mode in a wireless communication system, the method comprising:
communicating with a first network and a second network, at a first transmission mode comprising a first transmission power level and a first data rate;
transmitting a first change command to cause the user equipment from the second network to change the first transmission mode to a second transmission mode, wherein the second transmission mode comprises a second transmission power level and a second data rate; and
transmitting a maintain command to the user equipment to cause the user equipment to maintain the second transmission mode for a predetermined time period regardless of a second change command from the first network to increase at least one of transmission power level and data rate of the user equipment.

18. The method of claim 17, wherein the first network comprises a serving network and the second network comprises a non-serving network.

19. The method of claim 17, wherein the second transmission power level is lower than the first transmission power level.

20. A method of controlling uplink transmission of a user equipment in a soft handover mode in a wireless communication system, the method comprising:
communicating with a first network and a second network, at a first transmission mode comprising a first transmission power level and a first data rate;
transmitting a first change command to cause the user equipment from the second network to change the first transmission mode to a second transmission mode, wherein the second transmission mode comprises a second transmission power level and a second data rate; and
transmitting a maintain command to the user equipment to cause the user equipment to maintain the second transmission mode regardless of a second change command from the first network to increase at least one of transmission power level and data rate of the user equipment.

21. The method of claim 20, wherein the first network comprises a serving network and the second network comprises a non-serving network.

22. The method of claim 20, wherein the second transmission power level is lower than the first transmission power level.

23. The method of claim 20, wherein the second data rate is lower than the first data rate.

24. The method of claim 20, the first change command is associated with decreasing at least one of transmission power level and data rate of the user equipment.

25. The method of claim 20, wherein the first change command and the maintain command are represented by a scheduling command from the second network.

26. The method of claim 25, wherein the maintain command and the first change command are modulated to have opposite polarities.

27. The method of claim 20, wherein in the step of maintaining the second transmission mode, the user equipment decreases at least one of transmission power level and data rate if another change command is received from the first network to decrease at least one of transmission power level and data rate.

28. A user equipment adapted to control uplink transmission in a soft handover mode in a wireless communication system, the user equipment comprising:
means for communicating with a first network and a second network, at a first transmission mode comprising a first transmission power level and a first data rate;
means for receiving a first change command from the second network to change the first transmission mode to a second transmission mode, wherein the second transmission mode comprises a second transmission power level and a second data rate;
means for entering the second transmission mode; and
means for maintaining the second transmission mode for a predetermined time period regardless of a second change command from the first network to increase at least one of transmission power level and data rate of the user equipment.

29. The user equipment of claim 28, wherein the first network comprises a serving network and the second network comprises a non-serving network.

30. The user equipment of claim 28, wherein the second transmission power level is lower than the first transmission power level.

31. A user equipment adapted to control uplink transmission in a soft handover mode in a wireless communication system, the user equipment comprising:
means for communicating with a first network and a second network, at a first transmission mode comprising a first transmission power level and a first data rate;
means for receiving a first change command from the second network to change the first transmission mode to a second transmission mode, wherein the second transmission mode comprises a second transmission power level and a second data rate;
means for entering the second transmission mode; and
means for maintaining the second transmission mode while a maintain command is received from the second network regardless of a second change command from the first network to increase at least one of transmission power level and data rate of the user equipment.

32. The user equipment of claim 31, wherein the first network comprises a serving network and the second network comprises a non-serving network.

33. The user equipment of claim 31, wherein the second transmission power level is lower than the first transmission power level.

34. A network adapted to controlling uplink transmission of a user equipment in a soft handover mode in a wireless communication system, the network comprising:
means for communicating with a first network and a second network, at a first transmission mode comprising a first transmission power level and a first data rate;
means for transmitting a first change command to cause the user equipment from the second network to change the first transmission mode to a second transmission mode, wherein the second transmission mode comprises a second transmission power level and a second data rate; and
means for transmitting a maintain command to the user equipment to cause the user equipment to maintain the second transmission mode for a predetermined time period regardless of a second change command from the first network to increase at least one of transmission power level and data rate of the user equipment.

35. The network of claim 34, wherein the first network comprises a serving network and the second network comprises a non-serving network.

36. The network of claim 34, wherein the second transmission power level is lower than the first transmission power level.

37. A network adapted to controlling uplink transmission of a user equipment in a soft handover mode in a wireless communication system, the network comprising:
means for communicating with a first network and a second network, at a first transmission mode comprising a first transmission power level and a first data rate;
means for transmitting a first change command to cause the user equipment from the second network to change the first transmission mode to a second transmission mode, wherein the second transmission mode comprises a second transmission power level and a second data rate; and
means for transmitting a maintain command to the user equipment to cause the user equipment to maintain the second transmission mode regardless of a second change command from the first network to increase at least one of transmission power level and data rate of the user equipment.

38. The network of claim 37, wherein the first network comprises a serving network and the second network comprises a non-serving network.

39. The network of claim 37, wherein the second transmission power level is lower than the first transmission power level.

* * * * *